(12) United States Patent
Benjamin

(10) Patent No.: US 10,528,969 B2
(45) Date of Patent: **\*Jan. 7, 2020**

(54) SYSTEMS AND METHODS FOR PROVIDING A FINANCIAL DISCOUNT OR REWARD

(71) Applicant: Capital One Services, LLC, McLean, VA (US)

(72) Inventor: Moshe Benjamin, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/820,783

(22) Filed: Nov. 22, 2017

(65) Prior Publication Data

US 2018/0096377 A1 Apr. 5, 2018

Related U.S. Application Data

(63) Continuation of application No. 14/595,925, filed on Jan. 13, 2015.

(60) Provisional application No. 61/928,819, filed on Jan. 17, 2014.

(51) Int. Cl.
  *G06Q 30/02* (2012.01)
  *G06Q 20/38* (2012.01)

(52) U.S. Cl.
  CPC ....... *G06Q 30/0238* (2013.01); *G06Q 20/387* (2013.01); *G06Q 30/0225* (2013.01)

(58) Field of Classification Search
  CPC . G06Q 30/0238; G06Q 20/40; G06Q 30/0225
  USPC .... 705/14.38, 16, 14.33, 4, 14.23, 44, 14.17
  See application file for complete search history.

(56) References Cited

U.S. PATENT DOCUMENTS

| | | | |
|---|---|---|---|
| 2003/0065566 A1* | 4/2003 | Kodaka | G06Q 20/20 705/16 |
| 2004/0049427 A1 | 3/2004 | Tami et al. | |
| 2009/0271263 A1* | 10/2009 | Regmi | G06O 20/209 705/14.17 |
| 2009/0313109 A1* | 12/2009 | Bous | G06Q 30/02 705/14.31 |
| 2010/0070359 A1 | 3/2010 | Heasley et al. | |

(Continued)

FOREIGN PATENT DOCUMENTS

JP       2000242863 A   *   9/2000

OTHER PUBLICATIONS

Kelli Cruz, 2013, Building a successful reward system (Year: 2013).*

*Primary Examiner* — Tarek Elchanti
(74) *Attorney, Agent, or Firm* — Finnegan, Henderson, Farabow, Garrett & Dunner LLP

(57) ABSTRACT

The disclosed embodiments include methods and systems for providing a discount or reward at the point of sale. In one embodiment a system for providing a discount at the point of sale is disclosed. The system may be configured to receive transaction data relating to one or more purchase transactions and determine discount eligibility of the one or more purchase transactions. The system may also be configured to determine a discount amount based on the determined discount eligibility and the transaction data and apply the discount to the one or more purchase transactions. Further, the system may also be configured to display the applied discount to the user.

13 Claims, 9 Drawing Sheets

(56) References Cited

U.S. PATENT DOCUMENTS

| | | | |
|---|---|---|---|
| 2010/0076836 A1* | 3/2010 | Giordano | G06Q 20/10 705/14.38 |
| 2011/0173055 A1 | 7/2011 | Ross et al. | |
| 2012/0271705 A1* | 10/2012 | Postrel | G06Q 30/02 705/14.33 |
| 2012/0290366 A1 | 11/2012 | Giles | |
| 2013/0282470 A1 | 10/2013 | Schwarzkopf et al. | |
| 2013/0332251 A1* | 12/2013 | Ioannidis | G06Q 20/3224 705/14.23 |
| 2013/0339238 A1* | 12/2013 | Unland | G06Q 30/0617 705/44 |
| 2014/0074514 A1* | 3/2014 | Roll | G06Q 40/08 705/4 |
| 2014/0297383 A1 | 10/2014 | Mashiko | |
| 2014/0344041 A1* | 11/2014 | Yeleswarapu | G06Q 20/322 705/14.23 |

* cited by examiner

SYSTEMS AND METHODS FOR PROVIDING A FINANCIAL DISCOUNT OR REWARD

PRIORITY CLAIM

This application is a continuation of application Ser. No. 14/595,925, filed Jan. 13, 2015, which claims priority under 35 U.S.C. § 119 to U.S. provisional patent application No. 61/928,819 filed on Jan. 17, 2014, and entitled "Systems and Methods for Providing a Financial Discount or Reward." Each aforementioned application is incorporated herein by reference in its entirety.

TECHNICAL FIELD

The disclosed embodiments generally relate to systems and methods for providing a financial discount or reward and, more particularly, to systems and methods for providing a financial discount or reward on a transaction at the point of sale.

BACKGROUND

Financial service providers and other entities involved in purchase transactions regularly provide rewards programs for customers. These rewards programs often embody systems that allow customers to accumulate rewards in the form of, for example, points, miles, or cash. Typical systems provide accumulation of these rewards at the end of a month or billing cycle. Customers of typical rewards systems must then manually redeem their rewards later by logging in to their account and actively taking action.

While customers enjoy receiving rewards from financial service providers, these rewards programs can be difficult for consumers to understand, cumbersome to redeem, and time-consuming to accumulate. They do not provide customers with a clear statement of what the rewards are really worth in an easy to understand monetary value, nor do they provide the instant gratification that customers desire. Therefore, there exists a need to provide customers an easy to understand financial rewards program capable of providing instant rewards.

SUMMARY

In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary. As used herein, the term "discount" or "financial discount" broadly refers to any discount, deduction, rebate, reward, incentive, etc. provided to a user when making a purchase transaction.

The present disclosure provides improved systems and methods for providing a financial discount to a user at the time of a rewards eligible event. For example, consistent with disclosed embodiments, systems and methods for providing a financial discount on a transaction at the point of sale are disclosed. In one example, certain disclosed embodiments include systems and processes that may provide a user with a discount on a purchase transaction in a manner allowing the discount to be unapparent to the merchant processing the sale.

The disclosed embodiments may provide services that are valuable to both consumers and financial service providers. For example, aspects of the disclosed embodiments may provide a user with an instant financial discount when making a purchase using, for example, a credit or debit card provided by a financial service provider. For consumers, aspects of the disclosed embodiments may allow them to immediately save money on purchases and easily visualize and understand their savings. For financial service providers, aspects of the disclosed embodiments may allow them to attract new customers and encourage current customers to use the financial service provider's accounts more often to make purchases.

Other aspects of the disclosed embodiments are set forth below in this disclosure. For example, a disclosed embodiment includes a system for providing a discount at the point of sale. The system may include, for example, one or more memory devices storing instructions and one or more processors configured to execute instructions. The one or more processors may be configured to execute the instructions in order to receive transaction data relating to one or more purchase transactions and determine discount eligibility of the one or more purchase transactions. The one or more processors may also determine a discount amount based on the determined discount eligibility and the transaction data, and apply the discount to the one or more purchase transactions. The one or more processors may also be configured to display the applied discount to the user.

Another disclosed embodiment includes a method for providing a discount at the point of sale. The method may include, for example, receiving transaction data relating to one or more purchase transactions and determining, by one or more processors, discount eligibility of the one or more purchase transactions. The method may also include determining, by the one or more processors, a discount amount based on the determined discount eligibility and the transaction data, and applying the discount to the one or more purchase transactions. The method may also include displaying the applied discount to the user.

In accordance with additional embodiments of the present disclosure, a computer-readable medium is disclosed that stores instructions that, when executed by a processor(s), causes the processor(s) to perform processes consistent with disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Reference will now be made in detail to exemplary embodiments, examples of which are illustrated in the accompanying drawings and disclosed herein. Wherever convenient, the same reference numbers will be used throughout the drawings to refer to the same or like parts.

Disclosed embodiments provide systems and methods for providing a financial discount on a sale transaction. For example, in some embodiments, a financial service provider, such as a credit card company, bank, lender, etc., may provide and apply eligible clients with discounts on purchase transactions at the point of sale. In this way, a user eligible for a discount may only be charged (or debited, as the case may be) for a discounted sale price rather than the full sale price. The discount may be applied instantly, based on a user's eligibility and the eligibility of the purchase transaction, and remain unapparent to the merchant processing the sale. For example, while the user may only be charged for the discounted sale price, the merchant may receive the full sale price from the financial service provider associated with the user's financial product used to make the purchase. Based on the disclosed embodiments, a user may be able to view and understand the applied discount immediately, for example, in a financial statement.

Figure 1:
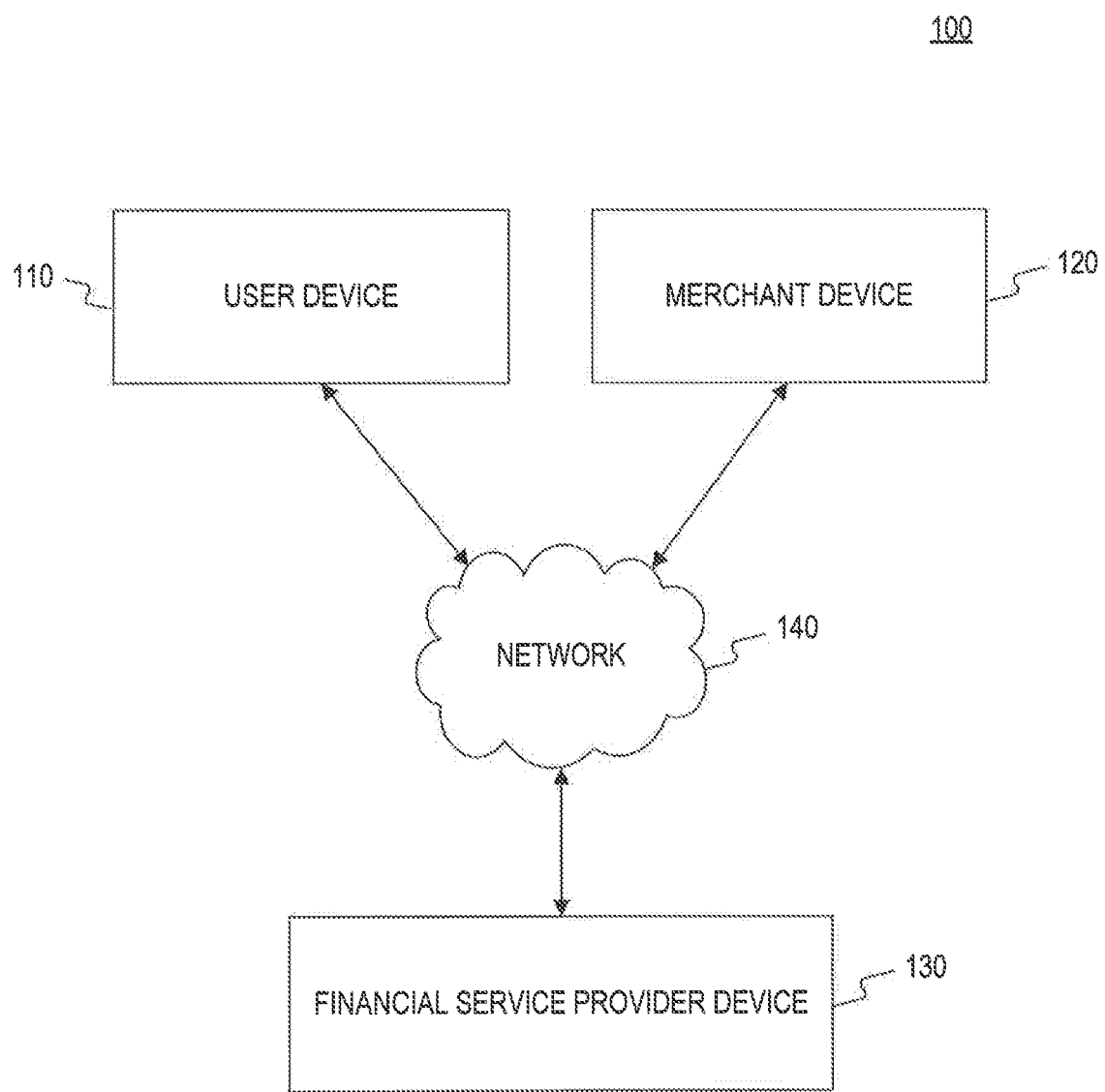
FIG. 1 is a block diagram of an exemplary system, consistent with the disclosed embodiments.

FIG. 1 shows a diagram of an exemplary system that may be configured to provide users a financial discount at the point of sale, consistent with disclosed embodiments. The components and arrangement of the components included in system 100 may vary. Thus, system 100 may further include other components that perform or assist in the performance of one or more processes consistent with the disclosed embodiments. The components and arrangements shown in FIG. 1 are not intended to limit the disclosed embodiments, as the components used to implement the disclosed processes and features may vary.

In accordance with disclosed embodiments, a financial discount system 100 may include a financial service provider (FSP) device 130. FSP device 130 may be a system associated with a financial service provider (not shown), such as a bank, a credit card company, a lender, brokerage firm, or any other type of financial service entity that generates, provides, manages, and maintains financial service accounts, etc. and/or provides rewards programs for one or more users. FSP device 130 may be one or more computing systems that are configured to execute software instructions stored on one or more memory devices to perform one or more operations consistent with the disclosed embodiments. For example, FSP device 130 may include one or more memory device(s) storing data and software instructions and one or more processor(s) configured to use the data and execute the software instructions to perform server-based functions and operations known to those skilled in the art. FSP device 130 may include one or more general purpose computers, mainframe computers, or any combination of these types of components. In certain embodiments, FSP device 130 may be configured as a particular apparatus, system, and the like based on the storage, execution, and/or implementation of the software instructions that enable performance of one or more operations consistent with the disclosed embodiments. FSP device 130 may be standalone, or it may be part of a subsystem, which may be part of a larger system. For example, FSP device 130 may represent distributed servers that are remotely located and communicate over a network (e.g., network 140) or a dedicated network, such as a LAN, for a financial service provider. An exemplary computing system consistent with FSP 130 is discussed in additional detail with respect to FIG. 2, below.

FSP device 130 may include or may connect to one or more storage devices configured to store data and/or software instructions used by one or more processors of FSP device 130 to perform operations consistent with disclosed embodiments. For example, FSP device 130 may include memory configured to store one or more software programs that enable performance of several functions when executed by a processor. The disclosed embodiments are not limited to separate programs or computers configured to perform dedicated tasks. For example, FSP device 130 may include memory that stores a single program or multiple programs. Additionally, FSP device 130 may execute one or more programs located remotely from FSP device 130. For example, FSP device 130 may access one or more remote programs stored in memory included with a remote component that, when executed, enable performance of operations consistent with the disclosed embodiments. In certain aspects, FSP device 130 may include server software that instructs a processor to generate, maintain, and provide services associated with rewards programs. In other aspects, FSP device 130 may connect separate server(s) or similar computing devices that generate, maintain, and provide services associated with rewards programs for a financial service provider associated with FSP device 130.

System 100 may also include one or more merchant devices 120. Merchant device 120 may be a computing system that is associated with a merchant or other business entity that provides goods and/or services, such as a retailer, grocery store, service provider (e.g., utilities, etc.), or any other type of entity that provides goods and/or services that consumers (e.g., user, charity, etc.) may purchase. While system 100 is shown with only one merchant device 120, the disclosed embodiments may be implemented in a system including two or more merchant devices 120 associated with any number of underlying business entities. Further, a merchant device 120 is not limited to conducting business in any particular industry or field.

Merchant device 120 may be associated with a merchant brick and mortar location(s) that a user may physically visit and purchase goods and services. Such physical locations may include merchant devices 120, which may include computing devices that perform financial service transactions with consumers (e.g., Point of Sale (POS) terminal(s), kiosks, etc.). Merchant device 120 may also include back and/or front-end computing components that store data and execute software instructions to perform operations consistent with disclosed embodiments, such as computers that are operated by employees of the merchant (e.g., back office systems, etc.). Merchant device 120 may also be associated with a merchant that provides goods and/or service via known online or e-commerce types of solutions. For example, such a merchant may sell goods via a website using known online or e-commerce systems and solutions to market, sell, and process online transactions.

In one embodiment, merchant device 120 may include one or more servers or other type of computer devices. The merchant system server(s) may be one or more computing devices configured to execute software instructions stored in memory to perform one or more processes consistent with the disclosed embodiments. For example, merchant device 120 may include one or more memory device(s) storing data and software instructions and one or more processor(s) configured to use the data and execute the software instructions to perform server-based functions and operations known to those skilled in the art. Merchant device 120 may include server(s) that are configured to execute stored software instructions to perform operations associated with a merchant, including one or more processes associated with processing purchase transactions, generating transaction data, generating product data (e.g., SKU data) relating to purchase transactions, etc. Merchant device 120 may include one or more servers that may be a general purpose computer, a mainframe computer, or any combination of these components. In certain embodiments, merchant device 120 (or a system including merchant device 120) may be configured as a particular apparatus, system, and the like based on the storage, execution, and/or implementation of the software instructions that enable performance of one or more operations consistent with the disclosed embodiments. A merchant server may be standalone, or it may be part of a subsystem, which may be part of a larger system. For example, a merchant server may represent distributed servers that are remotely located and communicate over a network (e.g., network 140) or a dedicated network, such as a LAN. An exemplary computing system consistent with merchant device 120 is discussed in additional detail with respect to FIG. 2.

In certain aspects, merchant device 120 may include one or more web servers that execute software to generate, maintain, and provide web site(s) for a respective merchant that is accessible over network 140. In other aspects, a merchant device 120 may connect separately to web server(s) or similar computing devices that generate, maintain, and provide web site(s) for a merchant.

In certain embodiments, a merchant may operate components associated with merchant device 120 to perform one or more processes consistent with the disclosed embodiments. For example, a merchant device 120 may be configured to execute software instructions to provide transaction data and/or product data relating to purchase transactions to FSP device 130 over network 140.

System 100 may further include one or more user devices 110. A user may operate a user device 110, which may be a desktop computer, laptop, tablet, smartphone, multifunctional watch, pair of multifunctional glasses, tracking device, or any suitable device with computing capability. User device 110 may have a financial application installed thereon, which may enable user device 110 to communicate with FSP device 130, through a network 140. Alternatively, user device 110 may connect to FSP device 130 and/or merchant device 120 through use of browser software. User device 110 may allow a user to access information stored in FSP device 130, such as, for example, financial information related to recent purchase transactions, financial discounts, financial statements, account information, rewards program information, and the like. An exemplary computing system consistent with user device 110 is discussed in additional detail with respect to FIG. 2. User device 110 is also discussed in additional detail with respect to FIG. 9, below.

A user may operate user device 110 to perform one or more operations consistent with the disclosed embodiments. In one aspect, a user may be a customer of a financial service provider associated with FSP device 130. For instance, a financial service provider may maintain a financial service account (e.g., credit card account) for the user that the user may use to purchase goods and/or services online or at brick and mortar locations associated with a merchant relating to merchant device 120. A user may also be a member of a rewards program, such as a rewards program offered by a financial service provider providing rewards benefits for eligible transactions conducted using a financial product or service offered by the financial service provider. Consistent with disclosed embodiments, a user may operate user device 110 to initiate a purchase transaction with a merchant or merchant device 120 and receive communications associated with rewards benefits associated with the purchase transaction. Further, a user may operate user device 110 to view a financial service account or financial statement provided by a financial service provider or FSP device 130.

System 100 may further include a network 140. Network 140 may comprise any type of computer networking arrangement used to exchange data. For example, network 140 may be the Internet, a private data network, a virtual private network using a public network, a WiFi network, a LAN or WAN network, and/or other suitable connections that may enable information exchange among various components of the financial discount system 100. Network 140 may also include a public switched telephone network ("PSTN") and/or a wireless cellular network. Network 140 may be a secured network or unsecured network. In other embodiments, one or more components of system 100 may communicate directly through a dedicated communication link(s), such as links between FSP device 130 and merchant device 120.

Other components known to one of ordinary skill in the art may be included in financial discount system 100 to process, transmit, provide, and receive information consistent with the disclosed embodiments. In addition, although not shown in FIG. 1, components of system 100 may communicate with each other through direct communications, rather than through network 140. Direct communications may use any suitable technologies, including, for example, Bluetooth™, Bluetooth LE™, WiFi, near field communications (NFC), or other suitable communication methods that provide a medium for transmitting data between separate devices.

Figure 2:
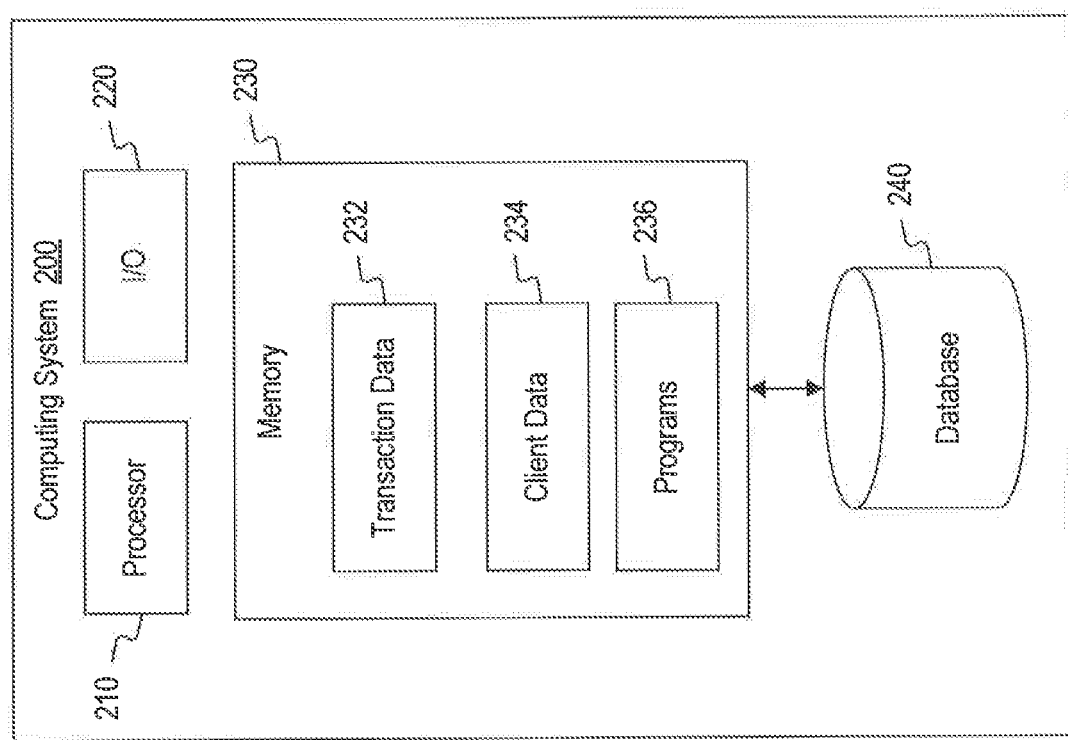
FIG. 2 is a block diagram of an exemplary computing system, consistent with the disclosed embodiments.

FIG. 2 shows a diagram of an exemplary computing system 200 illustrating a computing system configuration that may be associated with FSP device 130, merchant device 120, and/or user device 110, consistent with disclosed embodiments. In one embodiment, computing system 200 may include one or more processors 210, one or more memories 230, and one or more input/output (I/O) devices 220. In some embodiments, computing system 200 may take the form of a server, general purpose computer, a mainframe computer, laptop, smartphone, mobile device, or any combination of these components. In certain embodiments, computing system 200 (or a system including computing system 200) may be configured as a particular apparatus, system, and the like based on the storage, execution, and/or implementation of the software instructions that enable performance of one or more operations consistent with the disclosed embodiments. Computing system 200 may be standalone, or it may be part of a subsystem, which may be part of a larger system.

Processor 210 may include one or more known processing devices, such as a microprocessor from the Pentium™ or Xeon™ family manufactured by Intel™, the Turion™ family manufactured by AMD™, or any of various processors manufactured by Sun Microsystems, for example. Processor 210 may constitute a single core or multiple core processor that executes parallel processes simultaneously. For example, processor 210 may be a single core processor configured with virtual processing technologies. In certain embodiments, processor 210 may use logical processors to simultaneously execute and control multiple processes. Processor 210 may implement virtual machine technologies, or other known technologies to provide the ability to execute, control, run, manipulate, store, etc. multiple software processes, applications, programs, etc. In another embodiment, processor 210 may include a multiple-core processor arrangement (e.g., dual, quad core, etc.) configured to provide parallel processing functionalities to allow computing system 200 to execute multiple processes simultaneously. One of ordinary skill in the art would understand that other types of processor arrangements could be implemented that provide for the capabilities disclosed herein. The disclosed embodiments are not limited to any type of processor(s) included in computing system 200.

Memory 230 may include one or more storage devices configured to store instructions used by processor 210 to perform functions related to disclosed embodiments. For example, memory 230 may be configured to store one or more software instructions, such as program(s) 236 that may enable performance of one or more operations when executed by processor 210. The disclosed embodiments are not limited to separate programs or computers configured to perform dedicated tasks. For example, memory 230 may include a single program 236 that enables performance of the functions of computing system 200, or program 236 could comprise multiple programs. Additionally, processor 210 may execute one or more programs located remotely from computing system 200. For example, FSP device 130, merchant device 120, or user device 110, may, via computing system 200 (or variants thereof), access one or more remote programs that, when executed, enable performance of functions related to certain disclosed embodiments. Processor 210 may further execute one or more programs located in database 240. In some embodiments, programs 236 may be stored in an external storage device, such as a cloud server located outside of computing system 200, and processor 210 may execute programs 236 remotely.

Programs executed by processor 210 may cause processor 210 to execute one or more processes related to financial services provided to users including, but not limited to, processing credit and debit card transactions, checking transactions, fund deposits and withdrawals, transferring money between financial accounts, lending loans, processing payments for credit card and loan accounts, and providing a loyalty/rewards program, including providing a financial discount on a sale transaction.

Memory 230 may also store data that may reflect any type of information in any format that the system may use to perform operations consistent with the disclosed embodiments. Memory 230 may store instructions to enable processor 210 to execute one or more applications, such as server applications, a loyalty/rewards application, network communication processes, and any other type of application or software. Alternatively, the instructions, application programs, etc., may be stored in an external storage (not shown) in communication with computing system 200 via network 140 or any other suitable network. Memory 230 may be a volatile or non-volatile, magnetic, semiconductor, tape, optical, removable, non-removable, or other type of storage device or tangible (i.e., non-transitory) computer-readable medium.

Memory 230 may include transaction data 232. Transaction data 232 may include information related to purchase transactions initiated by a user. For example, transaction data 232 may include a user identifier and a purchase price. The user identifier may be a credit or debit card number, and account number, or another means for identifying the user initiating the purchase transaction. The purchase price may include a number representing the total sale price of the purchase transaction and/or may include a list of the various items purchased from the merchant. In some embodiments, merchant device 120 may collect, generate, and provide transaction data 232 relating to purchase transactions involving a user to FSP device 130. In some embodiments, merchant device 120 may further provide product data (e.g., SKU data) and transaction data 232 relating to purchase transactions involving a user to FSP device 130. Merchant device 120 may provide this information to FSP device 130 via network 140. Alternatively transaction data 232 may be stored in database 240 or in an external storage (not shown) in communication with computing system 200 via network 140 or any other suitable network.

Memory 230 may further include client data 234. Client data 234 may include information about particular clients of the financial service provider. For example, client data 234 may include clients' account information, debit or credit card information, history of purchase transactions, financial statements, credit score, risk profile, and/or rewards program information, including accumulated rewards points, rewards points associated with a particular purchase, and discount eligibility. Client data 234 may further contain one or more user profiles associating the account information, debit or credit card information, history of purchase transactions, financial statements, credit score, risk profile, and/or rewards program information, including accumulated rewards points, rewards points associated with a particular purchase, and discount eligibility related to various users. When a user initiates a purchase transaction, processor 210 may analyze client data 234 or user profiles before authorizing the purchase transaction on behalf of a user. Alternatively client data 234 may be stored in database 240 or in an external storage (not shown) in communication with computing system 200 via network 140 or any other suitable network.

Processor 210 may analyze transaction data 232 in reference to client data 234. For example, processor 210 may analyze transaction data 232 to determine which client with information stored in client information 234 is the particular user initiating the purchase transaction. Processor 210 may access the particular user's client information 234 to determine their account information, debit or credit card information, history of purchase transactions, financial statements, credit score, risk profile, and/or rewards program information, including accumulated rewards points, rewards points associated with a particular purchase, and discount eligibility.

I/O devices 220 may be one or more devices that are configured to allow data to be received and/or transmitted by computing system 200. I/O devices 220 may include one or more digital and/or analog communication devices that allow computing system 200 to communicate with other machines and devices, such as other components of system 100 shown in FIG. 1. For example, computing system 200 may include interface components, which may provide interfaces to one or more input devices, such as one or more keyboards, mouse devices, and the like, which may enable computing system 200 to receive input from an operator of FSP device 130 (not shown).

Computing system 200 may also contain one or more database(s) 240. Alternatively, computing system 200 may be communicatively connected to one or more database(s) 240. Computing system 200 may be communicatively connected to database(s) 240 through network 140. Database 240 may include one or more memory devices that store information and are accessed and/or managed through computing system 200. By way of example, database(s) 240 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. Database 240 may include computing components (e.g., database management system, database server, etc.) configured to receive and process requests for data stored in memory devices of database(s) 240 and to provide data from database 240.

As noted above, FSP device 130 may include at least one computing system 200. Further, although sometimes discussed here in relation to FSP device 130, it should be understood that variations of computing system 200 may be used by other components of financial discount system 100, including merchant device 120 and user device 110. Computing system 200 may be a single server or may be configured as a distributed computer system including multiple servers or computers that interoperate to perform one or more of the processes and functionalities associated with the disclosed embodiments.

In some aspects, at least one computing device in merchant device 120 may include the same or similar configuration and/or components of computing system 200. Computing system 200 when implemented in merchant device 120 may include hardware and/or software installed therein for performing methods and processes disclosed herein. Computing system 200 may also enable merchant device 120 to sell products and/or services through network 140. For example, a user may use user device 110 to browse a webpage hosted or otherwise associated with merchant device 120 that runs on computing system 200, and may make a purchase of products or services offered by a merchant associated with merchant device 120 through the webpage. In other embodiments, a user may initiate a purchase at a brick and mortar establishment associated with a merchant, and merchant device 120 (via, e.g., computing system 200, which may be a point of sale terminal in some embodiments) may communicate with FSP device 130 over network 140 to authorize the purchase. For example, a user may use a bank card managed by a financial service provider to purchase products or services from a merchant operating merchant device 120, and merchant device 120 may report such a transaction to computing system 200 of the financial service provider in order to, for example, verify authentication information about the bank card used by user. In some embodiments, merchant device 120 may obtain additional information related to the user, for example the user and/or transaction's discount eligibility.

Figure 3:
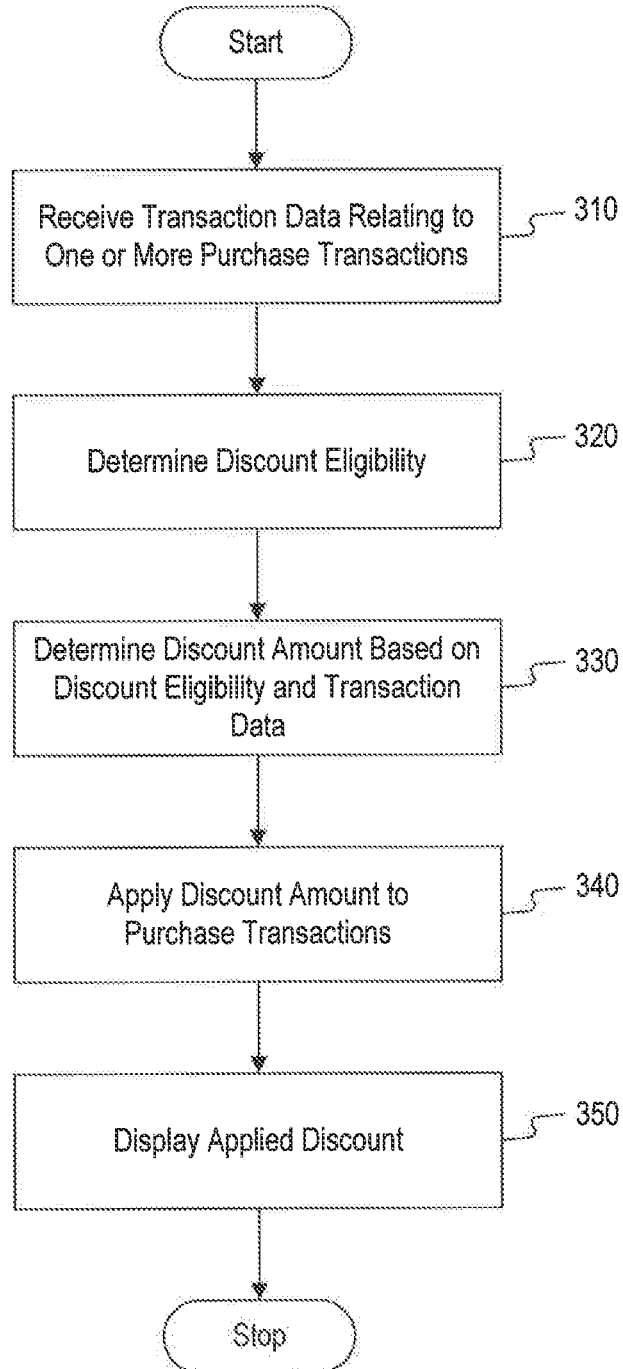
FIG. 3 is a flowchart of an exemplary process for providing a financial discount, consistent with the disclosed embodiments.

FIG. 3 shows a flowchart of an exemplary financial discount process 300, consistent with the disclosed embodiments. The exemplary process 300 may be performed by processor 210 of, for example, FSP device 130 executing instructions encoded on a computer-readable medium storage device. It is to be understood, however, that one or more steps of process 300 may be implemented by other components of system 100 (shown or not shown), including merchant device 120 and/or user device 110. At step 310, FSP device 130 may receive transaction data relating to one or more purchase transactions. Merchant device 120 may collect transaction data at the point of sale, for example, by processing a user's credit or debit card, and transmit the transaction data to FSP device 130 as part of authorizing the purchase transaction in payment for a product or service provided by a merchant. This transaction data may be transmitted to FSP device 130 over network 140. Merchant device 120 may transmit the transaction data via I/O 220 as implemented within merchant device 120. I/O 220 in computing system 200 implemented in FSP device 130 may receive the transaction data. In some embodiments, this data may be stored in memory 230, for example, as transaction data 232.

FSP device 130 may use the transaction data 232 to determine discount eligibility (step 320). For example, FSP device 130 may compare transaction data 232 received from merchant device 120 with client data 234 to identify a user (using, e.g., a financial account identifier indicated in the transaction data 232) and determine that the user initiating the purchase transaction is eligible to receive a discount on the purchase transaction. Additionally or alternatively, FSP device 130 may compare transaction data 232 received from merchant device 120 with client data 234 to identify whether a product associated with a purchase—as may be indicated in the transaction data 232—falls within a category of purchases for which the user has selected (via, e.g., user device 110) to receive rewards—as may be indicated in the client data 234 associated with the user. FSP device 130 may further determine the discount amount to which the user is eligible. As discussed elsewhere, discount eligibility may be based on a user's risk profile as may be indicated, for example, in client data 234 or in database 240.

At step 330, FSP device 130 may determine the exact discount amount. In some embodiments, FSP device 130 may determine the discount amount based on criteria set by the financial service provider, merchant, user, and/or an agreement between the financial service provider, merchant, and/or user. For example, FSP device 130 may apply the same discount amount to all purchases made by the user, or FSP device 130 may provide a first discount amount to purchases of a particular purchase type (gasoline purchases, purchases at a particular merchant, etc.) and a second discount amount for all remaining purchases based on, for example, the user's determined discount eligibility and transaction data 232. Transaction data 232 may include a total sale price for the purchase transaction. The discount amount may be based on, for example, a percentage of the purchase price or any other rewards arrangement known in the art. Processor 210 may determine the discount amount by calculating the discount eligibility percentage of the sale price contained in transaction data 232. The discount amount may be, for example, a numerical value that represents the monetary value of the discount to be applied to the transaction.

FSP device 130 may apply the calculated discount amount to the purchase transaction (step 340). FSP device 130 (via, e.g., processor 210) may apply the calculated discount, for example, by deducting the determined discount amount from the sale price, FSP device 130 may also transmit authorization for the purchase transaction back to merchant device 120. In some embodiments, FSP device 130 may authorize the entire sale price, although the user's account may only be assessed (e.g. charged or debited, as the case may be) for the discounted sale price. In this way, in some embodiments, the discount may be given by the financial service provider unapparent to the merchant.

FSP device 130 may also transmit the discount to, for example, user device 110 for display to the user (step 350). In some embodiments, the discount may be displayed to the user through an interface on user device 110 implementing a program 236 provided by the financial service provider associated with FSP device 130. In some embodiments, the discount may be displayed via an "in-app" message/alert. User device 110 may also implement a web browser that allows the user device to connect with FSP device 130 to, for example, display a financial statement stored on FSP device 130. Additionally or alternatively, the discount may be displayed to the user, for example, in a paper financial statement, on a sales receipt issued at the point of sale, etc. In some embodiments, this discount may be displayed as a line-item deduction on the financial statement or sales receipt.

In embodiments where the discount may be displayed on the receipt issued by the merchant, the paper or electronic receipt issued by the merchant may show both the sale price and the discounted sale price. This may be displayed even though the merchant received payment for the full sale price. If the receipt issued by the merchant is electronic, the user may access the receipt through user device 110.

Figure 4:
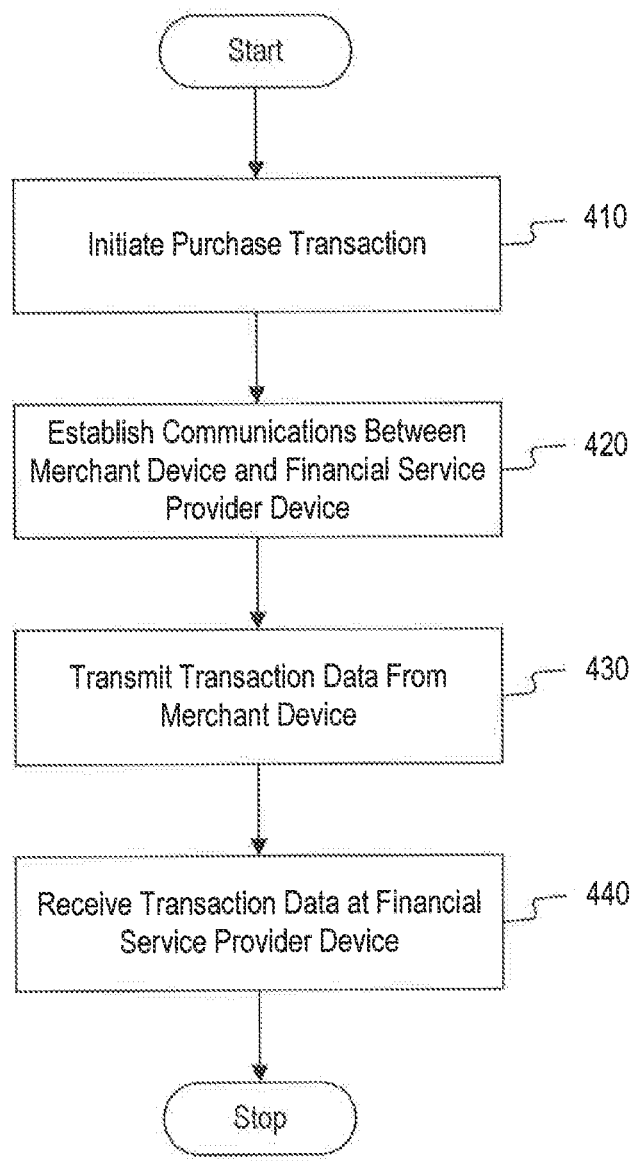
FIG. 4 is a flowchart of an exemplary process for receiving transaction data, consistent with the disclosed embodiments.

FIG. 4 shows a flowchart of an exemplary process 400 for receiving transaction data, consistent with the disclosed embodiments. At step 410, merchant device 120 may collect transaction data 232 when a user initiates a purchase transaction through a merchant associated with merchant device 120. In some aspects, the user may initiate the purchase transaction by initiating payment by credit or debit card. This may be done, for example, by swiping a debit or credit card or by authorizing an online sale via the credit or debit card. The collected transaction data 232 may include at least the sale price and a user identifier, such as an account number associated with the financial product used to initiate payment. For example, the user identification may be the credit or debit card number associated with the card that with which the user initiated the purchase. A user identifier, however, may include any other means for identifying the user known in the art.

Merchant device 120 may establish communications with FSP device 130 over network 140 (step 420)—i.e., the Internet, a private data network, a virtual private network using a public network, a WiFi network, a LAN or WAN network, and/or other suitable connections that may enable information exchange. Merchant device 120 may transmit transaction data 232 to FSP device 130 (step 430). For example, the data transmission may be accomplished through I/O 220 implemented within merchant device 120. As discussed above, the transaction data 232 may include the user identification, a total purchase price, an indication of the product or service being purchased, payment authorization request, etc. FSP device 130 may receive the transmitted transaction data 232 (step 440). In some embodiments, received transaction data 232 may be stored by FSP device 130 within memory 230. Received transaction data 232 may alternatively be stored in database 240, or it may be stored in an external storage device, such as a cloud server located outside of computing system 200. In some embodiments, FSP device 130 may also compare the received transaction data 232 with client data 234 (see, e.g., step 320).

Figure 5:
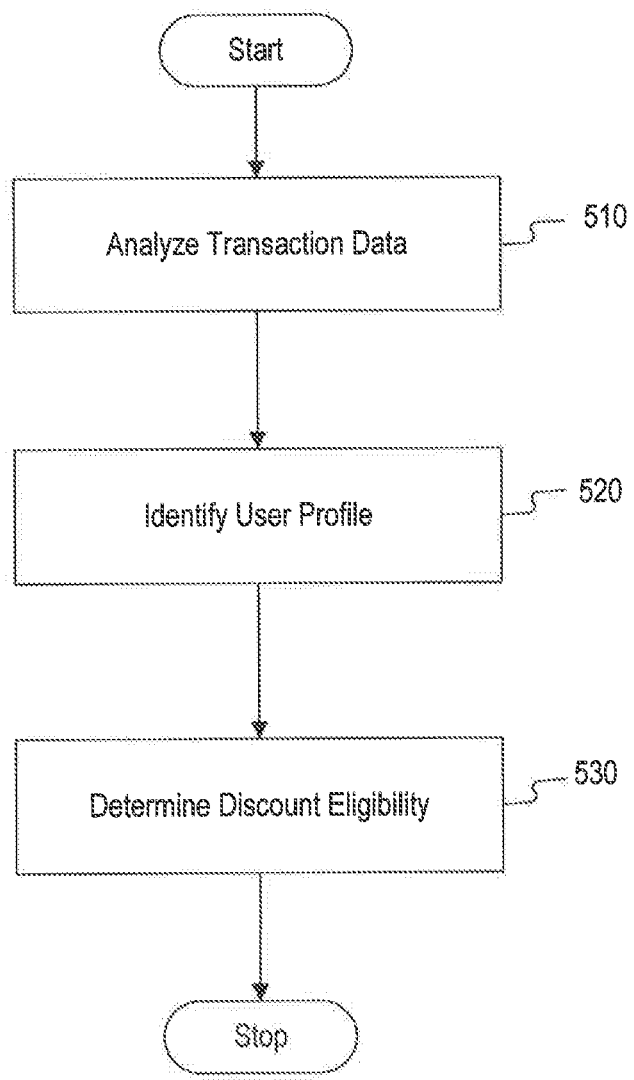
FIG. 5 is a flowchart of an exemplary process for determining discount eligibility, consistent with the disclosed embodiments.

FIG. 5 shows a flowchart of an exemplary process 500 for determining discount eligibility, consistent with the disclosed embodiments. At step 510, FSP device 130 may analyze transaction data 232 via, e.g., processor 210. For example, processor 210 may identify a user identifier from transaction data 232. As discussed above, the user identifier may be a credit or debit card number, and account number, or another means for identifying the user initiating the purchase transaction.

Based at least on the user identifier, processor 210 may identify a corresponding user profile (step 520). The user profile may be stored as, for example, client data 234, in database 240, or in an external storage device, such as a cloud server located outside of computing system 200. In some embodiments, processor 210 may search client data 234 and determine which of the one or more user profiles contained therein corresponds to the user identifier identified in the analyzed transaction data 232. The identified user profile may include, as non-limiting examples, account information, debit or credit card information, history of purchase transactions, financial statements, credit score, risk profile, and/or discount eligibility and preferences related to various users.

Processor 210 may also determine discount eligibility based at least on the corresponding user profile (step 530). In some embodiments, discount eligibility may be determined by simply searching the user profile for the discount eligibility information, such as a flag or the like stored in memory and associated with the identified user profile to indicate membership in a rewards program offered by, for example, the financial service provider. In certain embodiments, processor 210 may execute programs 236 that may cause processor 210 to perform necessary steps to determine discount eligibility consistent with disclosed embodiments. Programs 236 may cause processor 210 to determine, for example, a user's risk profile, credit score, or other pertinent data about the user. Further, programs 236 may cause processor 210 to determine, for example, whether the transaction data 232 received from merchant device 120 meets criteria set by one or more components of system 100 for discount eligibility. Programs 236 may include a formula, algorithm, etc. known in the art for determining eligibility in a rewards program. For example, whether a user and/or a transaction is discount eligible may be based on the amount of risk involved in providing the user a discount, and the amount of risk the financial service provider is willing to take in providing the discount.

Figure 6:
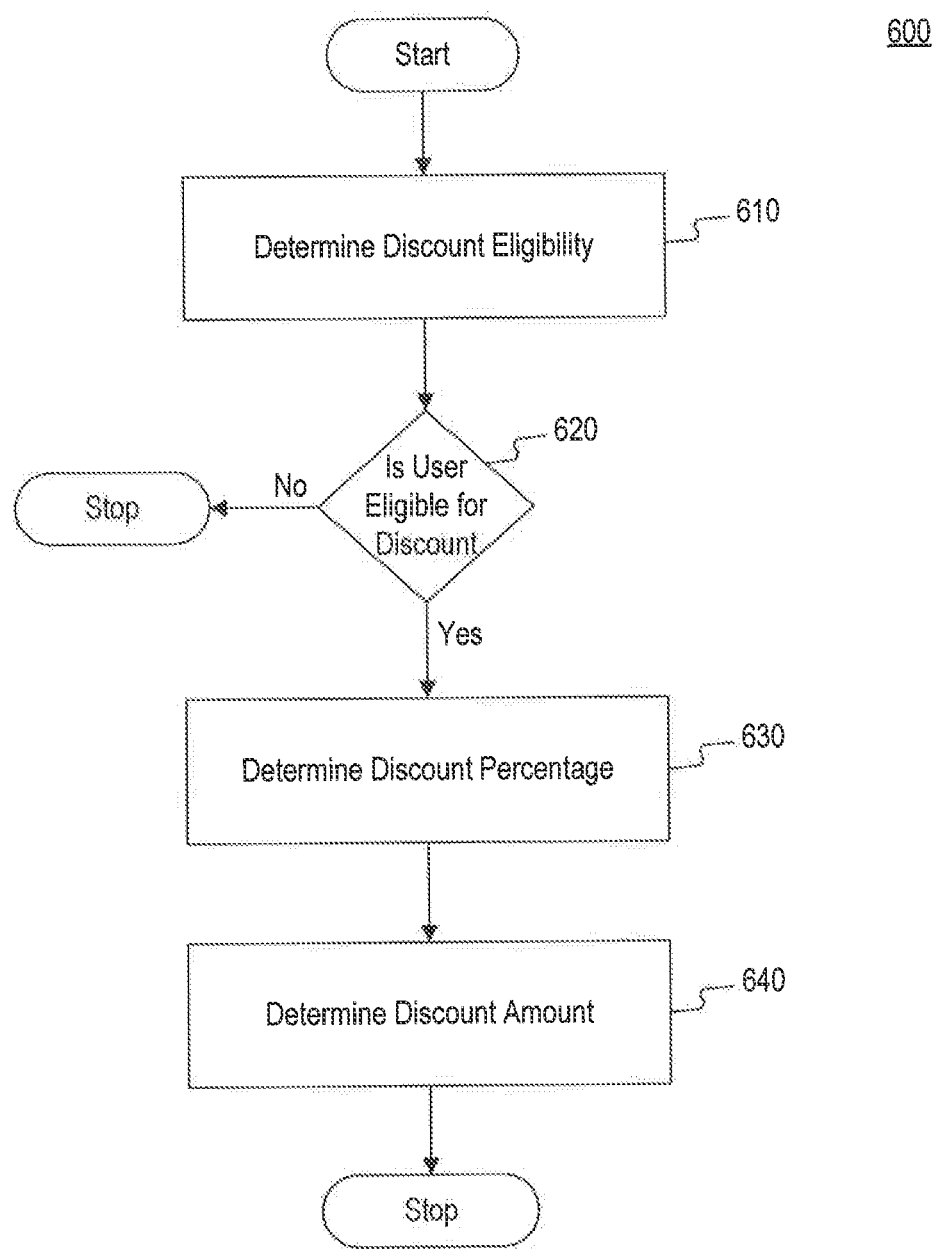
FIG. 6 is a flowchart of an exemplary process for determining a discount amount, consistent with the disclosed embodiments.

FIG. 6 shows a flowchart of an exemplary process 600 for determining a discount amount, consistent with the disclosed embodiments. At step 610, FSP device 130 may (via, e.g., processor 210) determine if the user is eligible for a discount. The process for determining discount eligibility is discussed with detail with respect to FIGS. 3 and 5.

If the user s not eligible for a discount (step 620; NO), processor 210 may not apply a discount to the initiated purchase transaction, and the process may end. The user may be charged for the full sale price without receiving a discount. If the user is eligible for a discount (step 620; YES), processor 210 may determine the discount percentage to which the user is eligible (step 630). In some embodiments, the discount percentage may be a part of the user profile stored as client data 234, and processor 210 may analyze the user profile to determine the discount percentage. Alternatively, the discount percentage may be determined by processor 210 based on a financial service provider's formula for determining a discount percentage. For example, processor 210 may apply the same discount amount to all purchases made by the user, or processor 210 may provide a first discount amount to purchases of a particular purchase type (gasoline purchases, purchases at a particular merchant, etc.) and a second discount amount for all remaining purchases based on, for example, the user's determined discount eligibility and transaction data 232. In some embodiments, the discount amount may be based on, for example, a percentage of the purchase price or any other rewards arrangement known in the art.

Processor 210 may apply the discount percentage to the sale price to determine a discount amount (step 640). For example, processor 210 may multiply the discount percentage by the sale price to determine the discount amount. The discount amount may be the total monetary value that may be deducted from the sale price in order to provide the user with a discount. In some embodiments, a financial service provider may provide reward points in terms other than a percentage reduction of cash value. For example, a financial service provider may provide rewards in the form of points, miles, merchant credits, etc. In such embodiments, processor 210 may identify the rewards points (or means of providing rewards) associated with the transaction, and processor 210 may determine the discount amount using a conversion factor between the rewards points and a cash value associated with the reward points.

Figure 7:
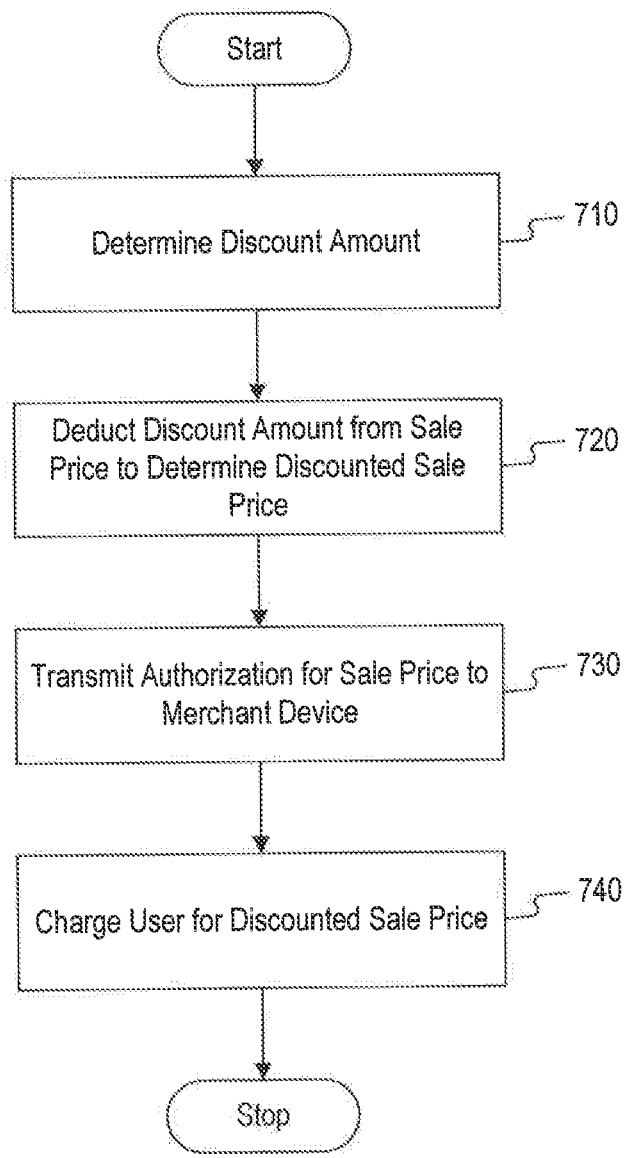
FIG. 7 is a flowchart of an exemplary process for applying a discount amount, consistent with the disclosed embodiments.

FIG. 7 shows a flowchart of an exemplary process 700 for applying the determined discount amount to the purchase transaction, consistent with the disclosed embodiments. At step 710, FSP device 130 (via, e.g., processor 210) may determine the discount amount, as discussed in further detail above with respect to FIG. 6. Processor 210 may deduct the discount amount from the sale price (step 720). For example, processor 210 may subtract the determined discount amount from the sale price to determine the discounted sale price. The discounted sale price may represent the total amount for which the user will be charged (or debited, as the case may be for the type of payment employed by the user). Processor 210 may also transmit authorization for the sale price to merchant device 120. As discussed above, authorization may be provided for the full sale price, not only the discounted sale price. In this way, the discount is applied in a manner unapparent to the merchant. Transmission of authorization may be accomplished across network 140, and processed by I/O devices 220. Processor 210 may also assess (e.g. charge or debit, as the case may be) the user's financial account for only the discounted sale price, effectively applying an instant reward for the purchase.

Figure 8:
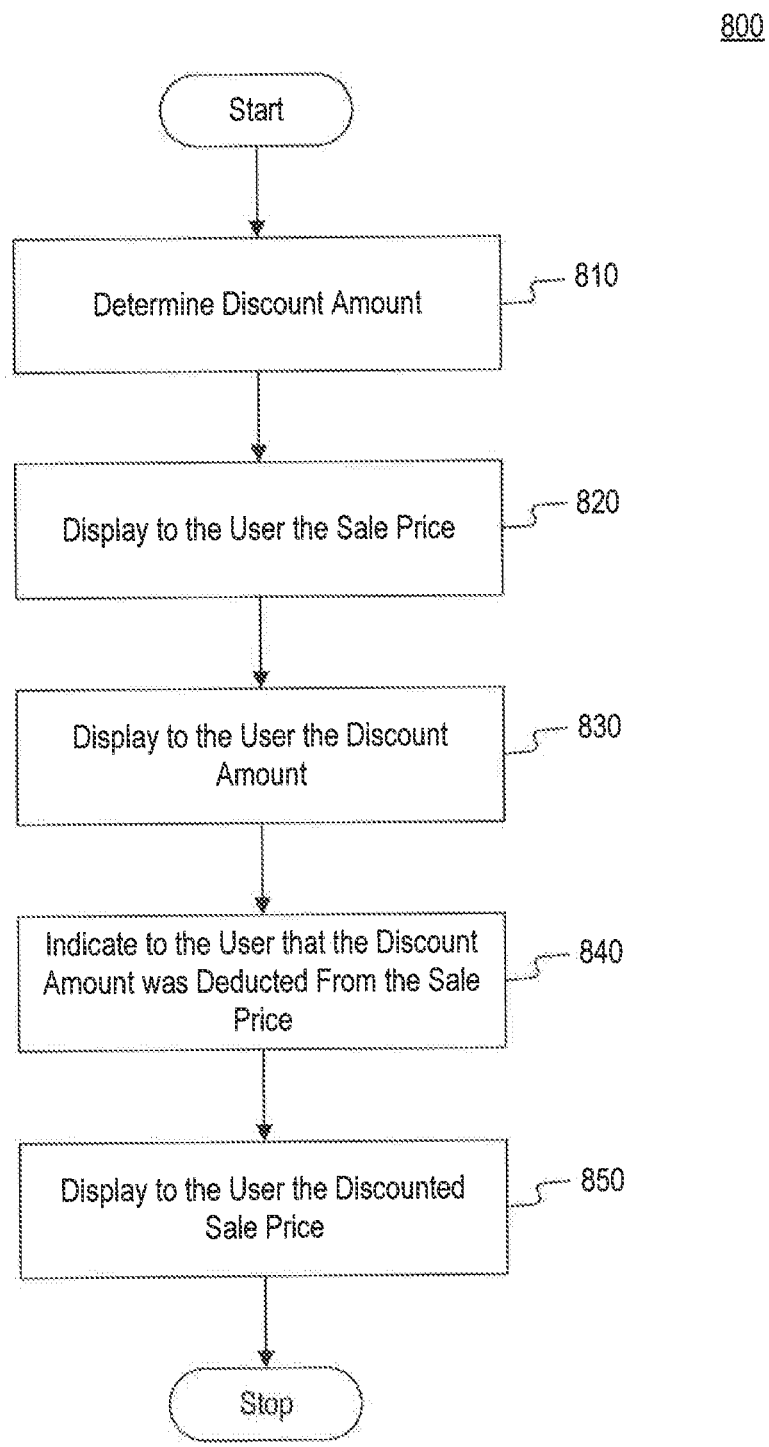
FIG. 8 is a flowchart of an exemplary process for displaying an applied discount, consistent with the disclosed embodiments.

FIG. 8 shows a flowchart of an exemplary process 800 for displaying the applied discount to a user, consistent with the disclosed embodiments. In step 810, FSP device 130 (via, e.g., processor 210) may determine the discount amount as discussed in further detail above with respect to FIG. 6. In certain embodiments, processor 210 may also apply the discount to the purchase transaction and assess (e.g. charge or debit, as the case may be) the user's account for the discounted price. This information may all become presented to the user, as discussed in steps 820-850, below.

In step 820, the system 100 may display the sale price to the user. In some embodiments, FSP device 130 may transmit the sale price data to user device 110. In other embodiments, merchant device 120 may access stored data associated with the product(s) or service(s) purchased to determine the sale price. User device 110 and/or merchant device 120 may analyze the data and display it to the user, for example, on a user interface associated with user device 110. In certain embodiments, the sale price may be displayed to the user on a merchant's receipt. The merchant's receipt may be paper or electronic. For example, the receipt ay depict the sale price on a printed receipt from a point of sale terminal, kiosk, etc., or the receipt may depict the sale price in a purchase confirmation e-mail, a display of the point of sale terminal, kiosk, etc., a display associated with user device 110, and the like.

Further, FSP device 130 may transmit the discount amount for display to the user (step 830) on, for example, user device 110 and/or merchant device 120. In some embodiments, the discount amount may be depicted as solely the monetary value of the discount deducted from the sale price. In other embodiments, the discount amount may also indicate rewards points (or other means of providing rewards benefits) associated with the discount amount. In still other embodiments, an indication of a rewards balance may also be provided to the user. The discount amount may be displayed to the user in the same or similar ways as discussed in step 820 with respect to the display of the sale price. Additionally, user device 110 and/or merchant device 120 may indicate to the user that the discount was deducted from the sale price (step 840). This may be accomplished, for example, by displaying both values in a vertical column with the sale price above the discount amount and using a minus sign to indicate that the discount amount is being subtracted from the sale price (see, e.g., FIG. 9). Thus, the discount may be shown as a line item deduction on a printed receipt from a point of sale terminal, kiosk, etc., an electronic receipt provided in an e-mail, a monthly statement provided by the financial service provider, the display of the point of sale terminal, kiosk, etc., and/or a display associated with user device 110, etc.

Additionally, the system 100 may display the discounted sale price to the user (step 850). The discounted sale price may be the total amount assessed (e.g. charged or debited, as the case may be) to the user based on the purchase transaction. The discounted sale price may be calculated by subtracting the discount amount from the sale price, as discussed above. Displaying the discounted sale price may be accomplished in the same or similar manner as discussed above with respect to the sale price and/or the discount amount.

Figure 9:
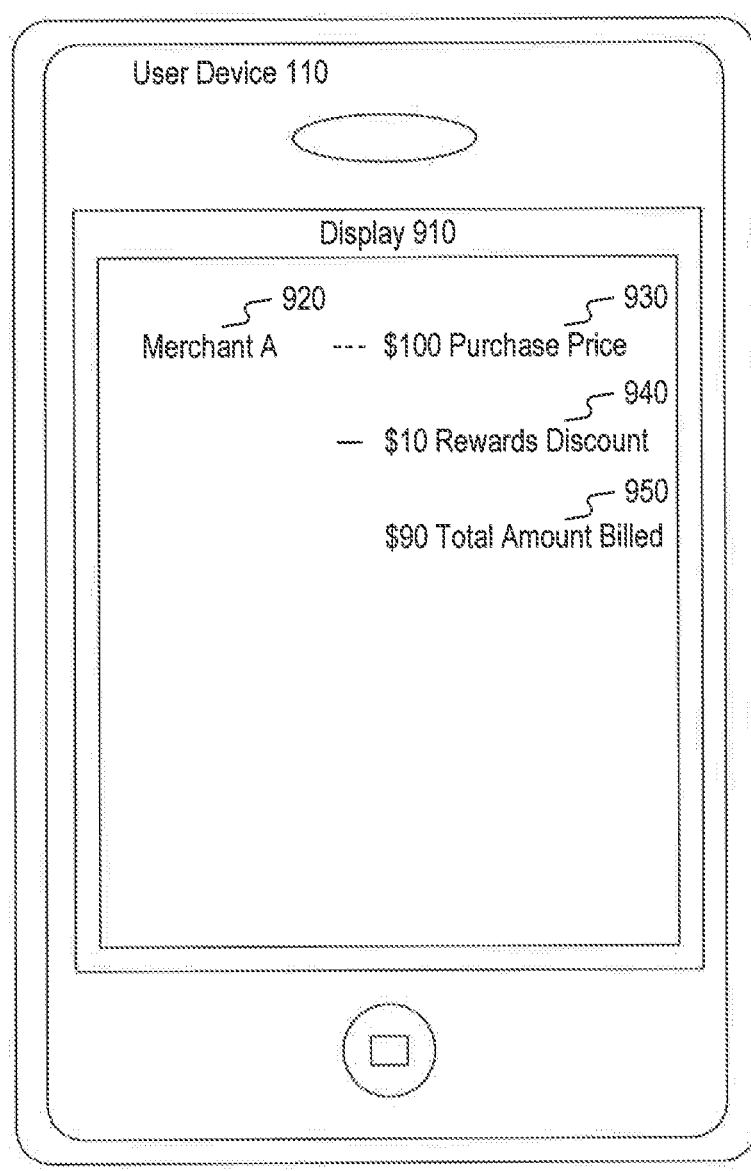
FIG. 9 is an example of a user device displaying a discount, consistent with the disclosed embodiments.

FIG. 9 shows an exemplary display 910, consistent with some of the disclosed embodiments. For ease of discussion, display 910 is described with respect to user device 110. It is to be understood, however, that the discount may be displayed on any suitable medium consistent with disclosed embodiments. According to some embodiments of the present disclosure, and as depicted in FIG. 9, the discount displayed to the user may be provided on user device 110. User device 110 may be a smartphone, as depicted. Alternatively, user device 110 may be a desktop computer, laptop, tablet, multifunctional watch, pair of multifunctional glasses, tracking device, or any suitable device with computing capability.

Display 910 may be configured to display to the user content that user device 110 accesses from components of system 100, including FSP device 130 and/or merchant device 120. In some embodiments, the content may include a financial statement (i.e., receipt) associated with a single purchase made at a merchant associated with merchant device 120 using a financial product provided by a financial service provider associated with FSP device 130. In other embodiments, the content may include financial statements, which may depict multiple purchases associated with an account of the user with the financial service provider. For example, financial statements may provide a purchase transaction history that may include a summary of previous transactions associated with the user stored in, for example, memory 230 and/or database 240. Alternatively, in some embodiments, financial statements may be stored in an external storage device, such as a cloud server located outside of computing system 200. Processor 210 may access the financial statements and I/O 220 may transmit the information over network 140 to user device 110.

The financial statements may include financial data such as merchant name 920 ("Merchant A"), purchase price 930 ($100), discount 940 ($10), and total amount charged 950 ($90). Merchant name 920 may indicates at which merchant the displayed purchase transaction was conducted. In the example associated with FIG. 9, merchant name 920 is "Merchant A." Purchase price 930 may indicate the total sale price for which the merchant receives payment from the financial service provider, such as the $100 indicated in FIG. 9. Discount 940 may be the discount amount calculated by, for example, FSP device 130 through the process described in detail previously with respect to FIG. 6. In the example associated with FIG. 9, the discount amount is $10 (i.e., 10% of the purchase price). Thus, the discount amount may include the monetary value by which the total sale price will be reduced because of the user's discount. The discount 940 may not be charged to the user. The total amount billed 950 indicates the amount that was assessed (e.g. charged) to the user from the transaction. Thus, in FIG. 9, the user is shown to have only been charged for $90, rather than purchase price of $100. As discussed above, the financial statements are not limited to single transactions and may, in fact, depict the purchase price, discount, and total amount billed for a plurality of transactions.

In some examples, some, none, or all of the logic for the above-described techniques may be implemented as a computer program or application, or as a plug in module or sub component of another application. The described techniques may be varied and are not limited to the examples or descriptions provided. In some examples, applications may be developed for download to mobile communications and computing devices, e.g., laptops, mobile computers, tablet computers, smartphones, etc., being made available for download by the user either directly from the device or through a website.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, while a financial service provider has been described herein as the entity generating, providing, managing, and/or maintaining the rewards programs for one or more users, it is to be understood that consistent with disclosed embodiments another entity may provide such services in conjunction with or separate from a financial service provider.

The claims are to be interpreted broadly based on the language employed in the claims and not limited to examples described in the present specification, of which the examples are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead are defined by the appended claims in light of their full scope of equivalents.

What is claimed is:

1. A payment processing system for processing a purchase transaction of a user with a merchant to assess an immediate discount on the purchase transaction, the payment processing system being unaffiliated with the merchant, comprising:
    an interface configured for communicating with the merchant over a communications network;
    one or more memory devices storing user profile data of the user and software instructions, the user profile data including (i) a discount purchase category selectable by the user via a computing device associated with the user and unassociated with the merchant and (ii) a risk profile associated with the user; and
    one or more processors configured to use the data and execute the software instructions to:
        receive at the payment processing system via the interface:
            a request to authorize a transaction for a payment account of the user, and
            transaction data relating to the transaction, the transaction data including a purchase amount, a purchase category associated with the transaction, and a user identifier identifying the user;
        identify, based on the user identifier, the user profile data;
        determine, from the received transaction data and based on the identified user profile data, a discount eligibility of the transaction based on an algorithm having elements of: (i) the purchase category associated with the transaction matching a purchase category identified in the user profile data, (ii) the risk profile associated with the user, and (iii) an amount of risk permitted by the payment processing system, wherein the discount eligibility is determined by the payment processing system on an endpoint of the communications network separate from the merchant and remote point of sale;
        calculate a discount amount based at least in part on the discount eligibility and the transaction data;
        transmit authorization for the purchase amount of the transaction to the merchant based on the purchase amount, without sending information associated with the discount amount determined by the one or more processors of the payment processing system;
        automatically assess to the payment account, as part of the transaction, a discounted payment amount calculated from the purchase amount minus the determined discount amount; and
        transmit, to the computing device, responsive to completing the transaction, an indication of the assessed discounted payment amount for display on the computing device, such that the indication may be displayed substantially simultaneously with the transmission of the authorization.

2. The system of claim 1, wherein the discount eligibility indicates whether at least one of the user or a purchase item of the purchase category associated with the transaction is eligible for a discount.

3. The system of claim 1, wherein the discount is based on a purchase price of the purchase item.

4. The system of claim 1, wherein the one or more processors are further configured to execute the instructions to:
identify a rewards points total associated with the transaction; and
determine the discount amount based on a cash value associated with the rewards points total.

5. The system of claim 1, wherein the one or more processors are further configured to transmit an indication of the discount amount to the user as a line-item deduction.

6. The system of claim 5, wherein the indication of the line-item deduction is provided in a computerized financial statement.

7. A method for processing a purchase transaction of a user with a merchant to assess an immediate discount on the purchase transaction, the method performed by a computer-implemented payment processing system unaffiliated with the merchant, comprising:
receiving, at the payment processing system via an interface:
a request to authorize a transaction for a payment account of the user, and
transaction data relating to the transaction, the transaction data including a purchase amount, a purchase category associated with the transaction, and a user identifier identifying the user;
identifying, based on the user identifier, user profile data associated with the user, the user profile data including (i) a discount purchase category selectable by the user and (ii) a risk profile associated with the user;
determining, by one or more processors, from the received transaction data and based on a user profile data of the user, a discount eligibility of the transaction based an algorithm having elements of: (i) the discount purchase category associated with the transaction matching a discount purchase category identified in the user profile data, (ii) the risk profile associated with the user, and (iii) an amount of risk permitted by the payment processing system, wherein the discount eligibility is determined by the payment processing system on an endpoint of the communications network separate from the merchant and remote point of sale;
calculating, by the one or more processors, a discount amount based at least in part on the discount eligibility and the transaction data;
transmitting authorization for the purchase amount of the transaction to the merchant based on the purchase amount, without sending information associated with the discount amount determined by the computer-implemented payment processing system;
automatically assessing to the payment account, as part of the transaction, a discounted payment amount calculated from the purchase amount minus the determined discount amount; and
transmitting, to a computing device, responsive to completing the transaction, an indication of the assessed discounted payment amount for display on the computing device, such that the indication may be displayed substantially simultaneously with the transmission of the authorization.

8. The method of claim 7, wherein the discount eligibility indicates whether at least one of the user or a purchase item of the purchase category associated with the transaction is eligible for a discount.

9. The method of claim 7, wherein the discount is based on a purchase price of the purchase item.

10. The method of claim 7, further comprising:
identifying a rewards points total associated with the transaction; and
determining the discount amount based on a cash value associated with the rewards points total.

11. The method of claim 7, further comprising transmitting an indication of the discount amount to the user as a line-item deduction.

12. The method of claim 11, wherein the line-item deduction is provided in a computerized financial statement.

13. A non-transitory computer-readable medium storing instructions that, when executed by a processor associated with a payment processing system unaffiliated with a merchant, cause the processor to perform operations for processing a purchase transaction of a user with a merchant to assess an immediate discount on the purchase transaction, the operations comprising:
receiving at the payment processing system over a communications network:
a request to authorize a transaction for a payment account of the user, and
transaction data relating to the transaction, the transaction data including a purchase amount, a purchase category associated with the transaction, and a user identifier identifying the user;
identifying, based on the user identifier, user profile data associated with the user, the user profile data including (i) a discount purchase category selectable by the user and (ii) a risk profile associated with the user;
determining, from the received transaction data and based on a user profile data, a discount eligibility of the transaction based on an algorithm having elements of: (i) the discount purchase category associated with the transaction matching a discount purchase category identified in the user profile data, (ii) the risk profile associated with the user, and (iii) an amount of risk permitted by the payment processing system;
calculating a discount amount based at least in part on the discount eligibility and the transaction data;
transmitting authorization for the purchase amount of the transaction to the merchant based on the purchase amount, without sending information associated with the discount amount determined by the processor of the payment processing system to the merchant;
automatically assessing to the payment account, as part of the transaction, a discounted payment amount calculated from the purchase amount minus the determined discount amount; and
transmitting, to a computing device, responsive to completing the transaction, an indication of the assessed discounted payment amount for display on the computing device, such that the indication may be displayed substantially simultaneously with the transmission of the authorization.

* * * * *